United States Patent Office 2,983,105
Patented May 9, 1961

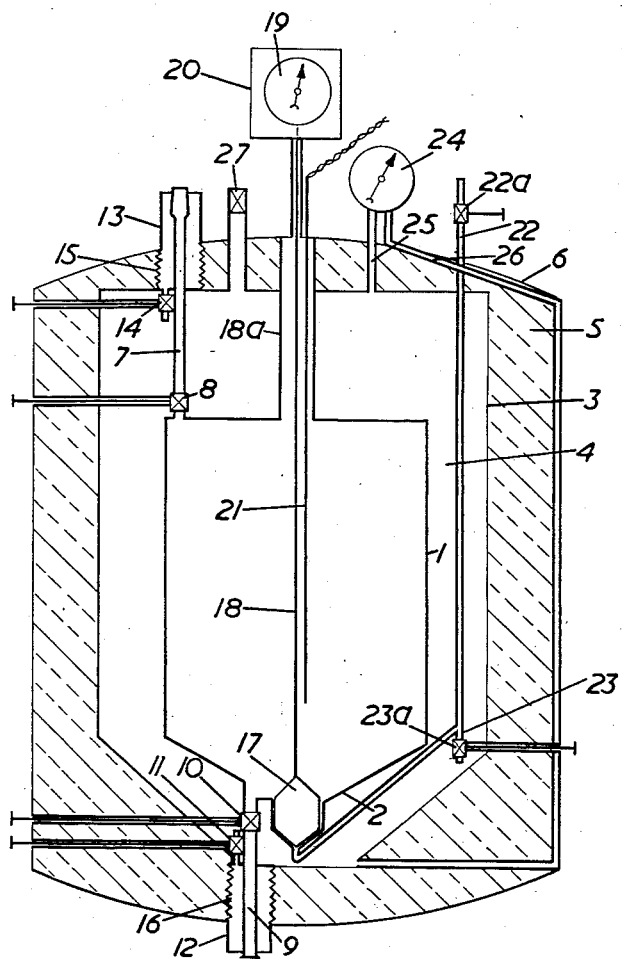

2,983,105
METHOD OF AND APPARATUS FOR STORING LIQUID OZONE

John Walter Armond, Worcester Park, England, assignor to The British Oxygen Company Limited, a British company Filed Feb. 24, 1959, Ser. No. 795,269
Claims priority, application Great Britain Feb. 24, 1958
5 Claims. (Cl. 62—49)

The present invention relates to the storage of liquid ozone in admixture with liquid oxygen.

Ozone can be prepared by various chemical or physical methods, the most popular and efficient of which is by passing oxygen gas through a silent electric discharge, whereby the oxygen is partially converted to gaseous ozone. Gaseous ozone is, however, unstable and in order to prevent its decomposition, it has been proposed in co-pending British application No. 6,498/57 in the name of The British Oxygen Company Limited to store ozone in the liquid form by cooling it down to its liquefaction temperature of −111.9° C. and mixing it with liquid oxygen, with which it is readily miscible.

The boiling point of liquid oxygen at atmospheric pressure is −111.9° C. and mixing it with liquid oxygen, with which it is readily miscible.

The boiling point of liquid oxygen at atmospheric pressure is −183° C. and at this temperature liquid ozone produces two mixtures of co-existence with liquid oxygen containing respectively 30% and 74% by weight of ozone. The respective densities of these two mixtures at −183° C. are 1.242 and 1.431 gms./cc., so that the mixture containing 74% ozone settles to the bottom of the storage container.

Owing to the difference in the boiling points of ozone and oxygen at atmospheric pressure, −111.9° C. and −183° C. respectively, gradual enrichment of a liquid ozone/liquid oxygen mixture in ozone will occur if free evaporation of the mixture is allowed to take place. Starting initially with an ozone poor mixture containing less than 30% by weight of ozone, a point would eventually be reached at which the second ozone rich phase containing 74% by weight of ozone would appear. The ozone rich mixture is considerably less stable than the ozone poor mixture and more sensitive to small amounts of contaminants. It is usually desirable, therefore, to store the ozone in the form of an ozone poor mixture.

It is an object of the present invention to provide a method and apparatus for storing liquid ozone/liquid oxygen mixtures in which ozone enrichment of the stored mixture is minimised.

It is a further object of the invention to provide such apparatus including means whereby any formation of the less stable ozone-rich mixture is indicated.

According to one aspect of the present invention, a method of storing a liquid ozone/liquid oxygen mixture comprises maintaining it at a temperature not substantially above −183° C. in a vessel immersed in a body of liquid oxygen.

According to another aspect of the invention, apparatus for storing a liquid ozone/liquid oxygen mixture comprises an inner vessel to contain the liquid mixture and a thermally-insulated outer vessel surrounding and spaced from the inner vessel and adapted to contain liquid oxygen.

The inner vessel is preferably cylindrical in shape and is made of a material having a high thermal conductivity, such as austenitic stainless steel or a copper alloy. The outer vessel, which may be made of austenitic stainless steel, aluminium or a copper alloy, is insulated in conventional manner with fibrous, cellular or preformed thermal insulant or by a vacuum space which may be powder-filled, in order to reduce the unavoidable heat influx to the outer vessel and to reduce storage losses to an economically low value. Where necessary, the insulation is contained in an outer shell surrounding and spaced from the outer vessel. The outer shell will usually be made of steel. When a liquid ozone/liquid oxygen mixture is stored, in accordance with the invention, at a temperature of −183° C. the vapour pressure of ozone is very low, so that there is practically no loss of ozone on storage.

In order to ensure that should enrichment of the stored mixture in ozone occur for any reason, such enrichment may be immediately detected, the storage vessel may be provided with means for continuously measuring and indicating the composition of the liquid at a point within the vessel.

The composition of the liquid is closely related to its density according to a known relationship and the means for measuring and indicating the liquid composition may therefore conveniently be arranged to measure and indicate the density of the liquid. The means may comprise a sinker immersed in the liquid and connected to an instrument located outside the storage apparatus for indicating the upward thrust exerted on the sinker which will vary with changes in density of the liquid. For example, the sinker may be connected by a thin wire to a spring balance which may be graduated in density units. In order to avoid contamination of the contents of the storage vessel by the atmosphere, the indicating instrument and its connection to the sinker must be enclosed in an air-tight casing. As previously stated, the liquid ozone/liquid oxygen mixture containing 74% by weight of ozone is considerably heavier than that containing 30% of ozone and accordingly will settle to the bottom of the storage vessel. It is desirable, therefore, that the sinker should be located at the bottom of the storage vessel. Conveniently, the bottom of the storage vessel may taper downwardly, the sinker being located at the lowest point of the tapered portion.

If enrichment of the stored mixture should occur, additional liquid oxygen may be added to the mixture and the mixture stirred, for example, by bubbling gaseous oxygen therethrough as hereinafter described.

For safe storage of the liquid ozone/liquid oxygen mixture, the level of liquid oxygen in the outer vessel must not be allowed to fall by evaporation so as to uncover the inner vessel. For this reason, a liquid level indicator may be fitted to the outer tank to give a continuous indication of the liquid oxygen level therein. This indicator may conveniently be of the conventional type which measures the differential pressure between the liquid and gaseous phases in the outer vessel.

It may also be convenient to provide a device for indicating the level of the liquid ozone/liquid mixture in the inner vessel. A particularly suitable device is described in co-pending British application No. 18,817/57 in the name of The British Oxygen Company Limited, in which a liquid sensing probe comprising a platinum resistance coil housed in a thin heat conductive sheath is associated with a detecting system, operated by variation of current flow through the coil due to differential heat dissipation. The probe is arranged to be movable vertically within the inner vessel, the liquid level being indicated by a substantial change in the electrical resistance of the coil. Alternatively, the platinum resistance coil may be replaced by a thermistor and heater, a substantial change in the resistance of the thermistor indicating the liquid level.

It is desirable that the amount of heat dissipated by the probe should be very small in order to avoid vaporisation of liquid oxygen from the liquid ozone/liquid oxygen mixture, and this can be effected with either of the above described arrangements if suitable amplifying means are included in the detector system. As with the composition indicator, it is essential that the liquid ozone/liquid oxygen level indicator should be totally enclosed in order to prevent contamination of the contents of the inner vessel by the atmosphere.

The liquid ozone/liquid oxygen mixture is fed to and withdrawn from the inner vessel through valve controlled inlet and outlet pipes located respectively at the top and bottom of the vessel. These pipes pass through the interspace between the inner and outer vessel and through the insulation. In their passage through the insulation, they may be jacketed by means of co-axial outer pipes of internal diameter greater than the outer diameter of the inlet or outlet pipe, liquid oxygen being passed through the outer pipe to or from the outer vessel during passage of the liquid ozone/liquid oxygen mixture through the inner pipe, the flow of liquid oxygen through the outer pipes being controlled by suitable valve means.

A valve-controlled oxygen inlet pipe may also be provided with opening into the inner vessel at its lowest point. Through this pipe, gaseous oxygen may be passed to stir the contents of the inner vessel. The oxygen inlet pipe may be provided with a valve-controlled branch, opening into the outer vessel, through which liquid oxygen may be fed from the outer vessel to the inner vessel to dilute the contents thereof should the ozone concentration therein become too high. To permit the release of gaseous oxygen, a gaseous oxygen relief valve may be provided on the outer vessel.

The invention will now be more particularly described with reference to the accompanying drawing, which shows a longitudinal diagrammatic section through an apparatus for storing a liquid ozone/liquid oxygen mixture according to the invention.

An inner vessel 1 which contains the liquid ozone/liquid oxygen mixture is preferably cylindrical in shape, and is made of a material having a high thermal conductivity, such as austenitic stainless steel or a copper alloy. The inner vessel 1 tapers downwardly at its base 2. An outer vessel 3 surrounds and is spaced from the inner vessel 1, the space 4 between inner and outer vessels 1 and 3 containing liquid oxygen. The inner vessel 1 is supported within the outer vessel 3 by suitable means of a conventional nature (not shown). The outer vessel 3, which may be made of austenitic stainless steel, aluminium, or a copper alloy, is surrounded by a fibrous, cellular or preformed thermal insulant 5, contained within a protective outer shell 6 which surrounds and is spaced from the outer vessel 3. The outer shell 6 will usually be made of steel. Alternatively, the space between the outer shell 6 and the outer vessel 5 may be evacuated and, if desired, filled with powder. The thermal insulation 5 serves to reduce the unavoidable heat influx to the outer vessel 3, and thus to reduce storage losses to an economically low value.

The liquid ozone/liquid oxygen mixture is fed to the inner vessel 1 through an inlet pipe 7 which is located at the top of the vessel. The inlet pipe 7 is controlled by an inlet valve 8, and passes through the insulant 5 and through the space 4 between the inner and outer vessels 1 and 3. The inlet pipe 7 is jacketed in its passage through the insulant 5 by a co-axial pipe 13 of internal diameter greater than the external diameter of the pipe 7, and communicating with the interior of the outer vessel 3 through a control valve 14.

Liquid oxygen is passed through the pipe 13 to the outer vessel 3 during passage of the liquid ozone/liquid oxygen mixture through pipe 7, in order to prevent vaporisation of the mixture.

A pipe 9 is provided at the bottom of the inner vessel 1 and controlled by a valve 10 for withdrawal of the liquid ozone/liquid oxygen mixture. The pipe 9 is jacketed in its passage through the insulant 5 by a co-axial pipe 12 of greater diameter which communicates with the interior of the inner vessel 3 through a control valve 11. The pipe 9 may thus be cooled during withdrawal of the liquid ozone/liquid oxygen mixture, by liquid oxygen withdrawn from the outer vessel 3 through the valve 11 and the pipe 12.

It will be appreciated that the apparatus is assembled at ambient temperature, and that when liquefied gases are admitted to the inner and outer vessels 1 and 3, considerable contraction of these vessels relative to the outer shell 6 will take place. In order to allow for this contraction, bellows means 15 and 16 of conventional type are included in the jacket pipes 13 and 12 respectively.

The composition of the stored liquid ozone/liquid oxygen mixture is related to its density according to a known relationship, and so means for measuring and indicating the density of the liquid may be arranged to measure and indicate the liquid composition. The means comprise a sinker 17 located at the lowest point of the tapering bottom 2 of inner vessel 1 and connected by a thin wire 18 passing through an instrument outlet 18a to an instrument 19 located outside the storage apparatus for indicating the upward thrust exerted on the sinker 17, which will vary with changes in the density of the liquid. The instrument 19 may be a spring balance graduated in density units. In order to avoid contamination of the contents of the inner vessel 1 by the atmosphere, the indicating instrument 19 and thin wire 18 connecting it to the sinker 17 are enclosed in an air-tight casing 20.

A liquid sensing probe indicated at 21 passes through the instrument outlet 18a into the inner vessel 1 and is arranged to be movable vertically within vessel 1 in order to indicate the level of the liquid ozone/liquid oxygen mixture. The construction and operation of such a probe are described in detail in co-pending British application No. 18,817/57 in the name of The British Oxygen Company Limited. The probe 21 comprises a platinum resistance coil housed in a thin heat-conductive sheath (not shown in detail) and associated with a detecting system (not shown) operated by variation of current flow through the coil due to differential heat dissipation. The probe 21 is moved vertically and a substantial change in the electrical resistance of the coil indicates the liquid level. In place of the platinum resistance coil, a thermistor and associated heater may be used.

It is desirable that the amount of heat dissipated by the probe 21 should be very small in order to avoid vaporisation of liquid oxygen from the liquid ozone/liquid oxygen mixture, and this can be effected with either of the above described liquid-sensing arrangements if suitable amplifying means are included in the detector system. The liquid ozone/liquid oxygen level indicator is totally enclosed in order to prevent contamination of the contents of the inner vessel 1 by the atmosphere.

A gaseous oxygen inlet pipe 22 controlled by a valve 22a opens into the inner vessel 1 at its lowest point. Through this pipe, gaseous oxygen may be passed to stir the contents of the inner vessel 1. A branch 23 in the lower part of the oxygen inlet pipe 22 opens into the outer vessel 3 and is controlled by a valve 23a. The branch 23 serves to admit liquid oxygen from space 4 into inner vessel 1 in order to maintain the composition of the liquid ozone/liquid oxygen mixture at the desired value.

For safe storage of the liquid ozone/liquid oxygen mixture, the level of liquid oxygen in the outer vessel 3 must not be allowed to fall by evaporation so as to uncover the inner vessel 1. Accordingly, a liquid level indicator 24 is mounted on the outer shell 6. The indicator 24 is of the conventional type which measures the differential pressure between the liquid and gaseous phases in the outer vessel 3, to whose top and bottom it is connected by pipes 25 and 26. The pipe 26 is led through the insulant 5 in contact with the inner wall of the outer shell 6, in order to ensure that any liquid oxygen in the pipe 26 is vaporised by heat exchange with the outer atmosphere. A gaseous oxygen relief valve 27 is provided on the outer vessel 3 in order to permit the release of excess gaseous oxygen.

I claim:

1. A process for the storage of a liquid ozone/liquid oxygen mixture comprising the steps of refrigerating said mixture by direct heat exchange with a body of liquid oxygen, continuously measuring the composition of said mixture, and introducing into said mixture liquid oxygen from said body of liquid oxygen to replace oxygen lost by evaporation from said mixture.

2. A process for the storage of a liquid ozone/ liquid oxygen mixture comprising the steps of refrigerating said mixture by direct heat exchange with a body of liquid oxygen, continuously measuring the density of said mixture, which density is related in known manner to the composition of said mixture, and introducing into said mixture liquid oxygen from said body of liquid oxygen to replace oxygen lost by evaporation from said mixture.

3. A process according to claim 2 wherein the liquid ozone/liquid mixture after addition of liquid oxygen thereto is stirred by bubbling gaseous oxygen therethrough.

4. Apparatus for the storage of a liquid ozone/liquid oxygen mixture comprising an inner vessel to contain said mixture, a thermally-insulated outer vessel surrounding and spaced from said inner vessel, a body of liquid oxygen contained in said outer vessel, means for continuously measuring and indicating the composition of said mixture, whereby loss of oxygen from said mixture may be detected and a valve-controlled conduit affording communication between said outer and inner vessels and immersed in said body of liquid oxygen.

5. Apparatus for the storage of a liquid ozone/liquid oxygen mixture comprising an inner vessel to contain said mixture, a thermally-insulated outer vessel surrounding and spaced from said inner vessel, a body of liquid oxygen contained in said outer vessel, a sinker immersed in said mixture and connected to an instrument, located outside the apparatus, for indicating the upward thrust exerted on said sinker, which thrust will vary with the density of said mixture, and a valve-controlled conduit affording communication between said outer and inner vessels and immersed in said body of liquid oxygen.

References Cited in the file of this patent

UNITED STATES PATENTS

| | | |
|---|---|---|
| 1,638,434 | Curme et al. | Aug. 9, 1927 |
| 2,010,060 | Copeman | Aug. 6, 1935 |
| 2,096,088 | Copeman | Oct. 19, 1937 |
| 2,243,847 | Hooper et al. | June 3, 1941 |
| 2,404,087 | Parsons | July 16, 1946 |
| 2,834,187 | Loveday | May 13, 1958 |
| 2,863,297 | Johnston | Dec. 9, 1958 |
| 2,871,669 | Mann et al. | Feb. 3, 1959 |